March 17, 1936.  C. F. MEILINK  2,034,589
DRAWER CONTROL MECHANISM
Filed Nov. 5, 1934  3 Sheets-Sheet 1
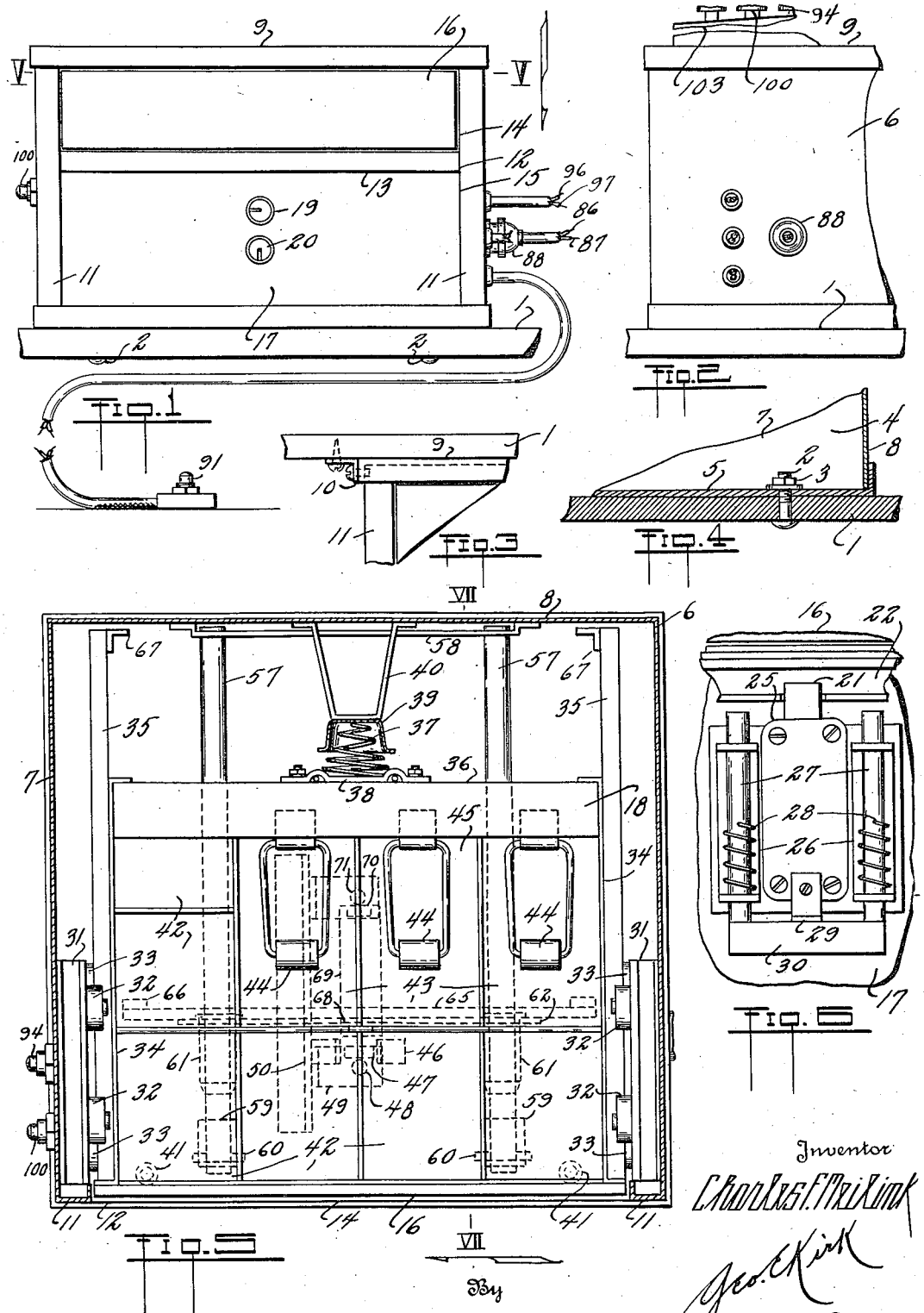

March 17, 1936.   C. F. MEILINK   2,034,589
DRAWER CONTROL MECHANISM
Filed Nov. 5, 1934   3 Sheets-Sheet 2
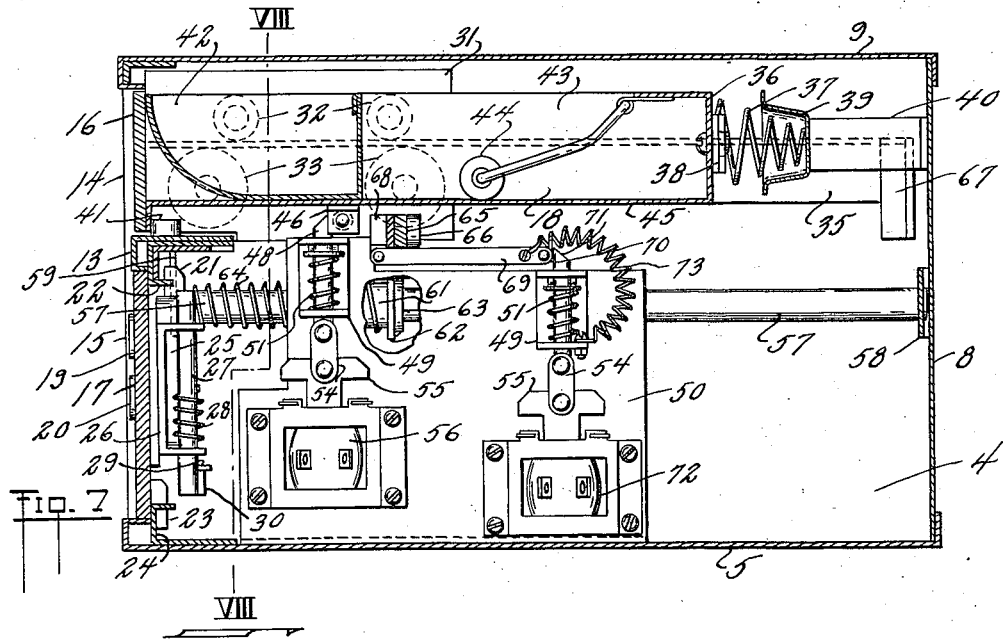
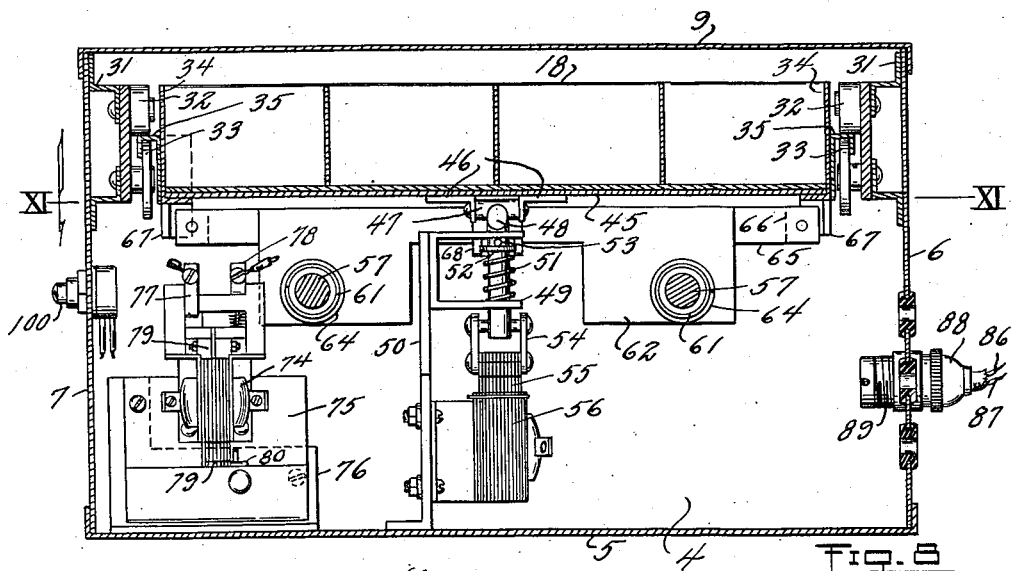
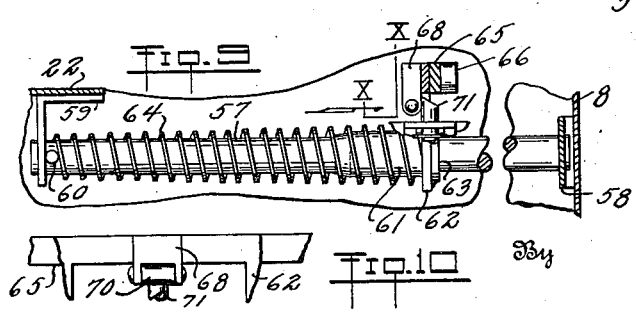

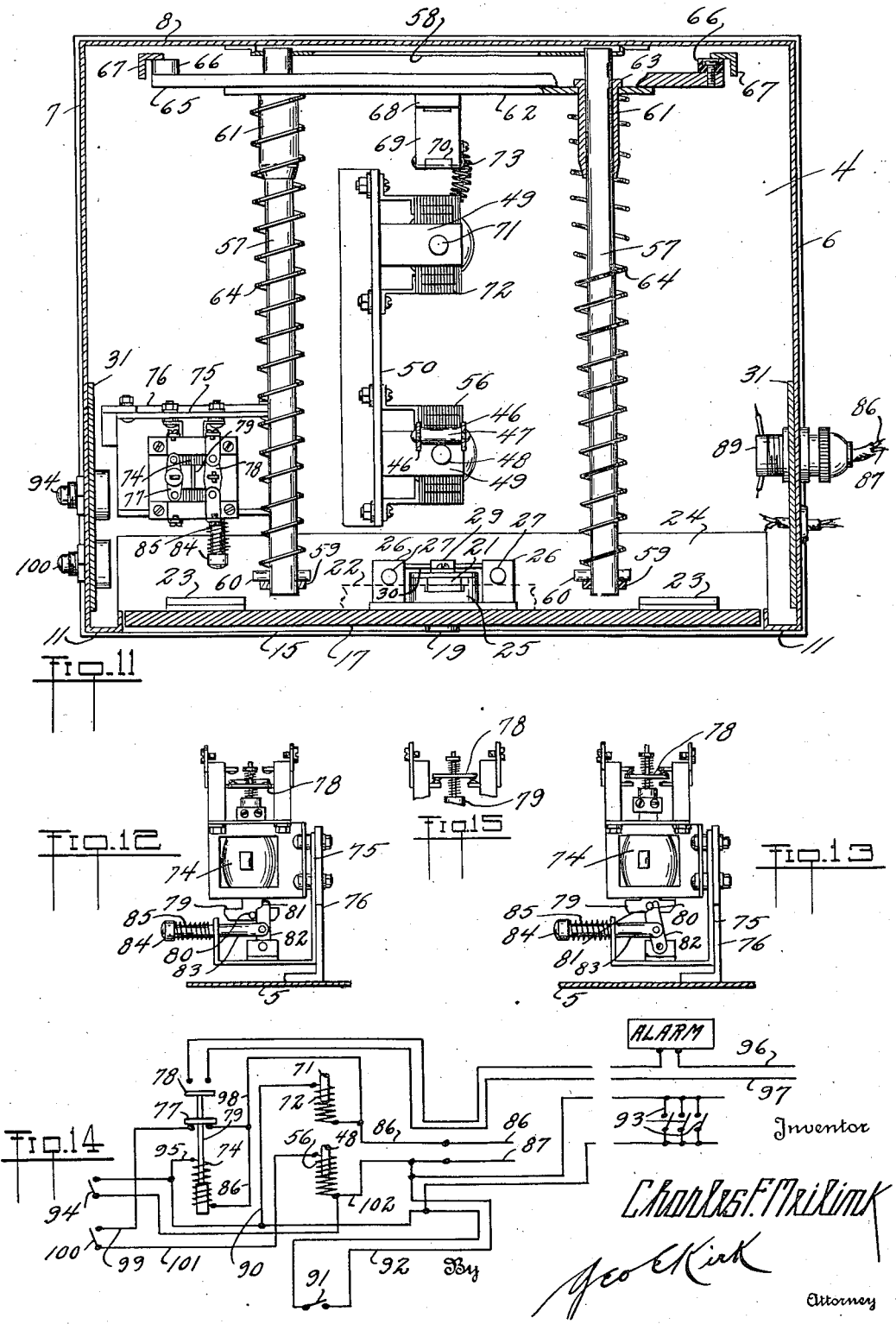

Patented Mar. 17, 1936

2,034,589

UNITED STATES PATENT OFFICE 2,034,589

DRAWER CONTROL MECHANISM

Charles F. Meilink, Toledo, Ohio

Application November 5, 1934, Serial No. 751,568

14 Claims. (Cl. 70—50)

This invention relates to the protection of valuables.

This invention has utility when incorporated in cash drawers for controlled opening and closing of the drawer with features for snap closing and locking by remote control.

Referring to the drawings:

Fig. 1 is a front view of an embodiment of the invention located on the top of a counter or other support;

Fig. 2 is a fragmentary view from the right of the device of Fig. 1;

Fig. 3 is a fragmentary view showing a mounting for the device when it is desired to suspend such from its support;

Fig. 4 is a detail view showing the mounting of the device when carried upon the support;

Fig. 5 is a view on the line V—V, Fig. 1, looking in the direction of the arrow;

Fig. 6 is a detail view of the lower chamber locking mechanism looking from within the device, said lock embodying features of re-locking against unauthorized forcible entry;

Fig. 7 is a view on the line VII—VII, Fig. 5, looking in the direction of the arrow;

Fig. 8 is a view on the line VIII—VIII, Fig. 7, looking in the direction of the arrow;

Fig. 9 is a detail showing a modified form of drawer closing mechanism from the showing in Fig. 7;

Fig. 10 is a view on the line X—X, Fig. 9, looking in the direction of the arrow;

Fig. 11 is a view on the line XI—XI, Fig. 8, looking in the direction of the arrow;

Fig. 12 is a side view of the solenoid controlled mechanism for breaking the drawer opening control circuit and closing the alarm circuit;

Fig. 13 is a view similar to Fig. 12 with the re-set mechanism locking the alarm circuit closed and the drawer opening circuit open;

Fig. 14 is a wiring diagram for the controls herein; and

Fig. 15 is a detail of the switch mechanism of Fig. 12 in which the alarm circuit is normally closed and opened simultaneously with the control circuit.

The invention herein comprises means for operating a cash drawer, the means being electrically controlled so that an operator may, by closing a proper switch, cause the drawer to slide into open position. In case of an emergency, by the operation of a second switch, either at the device itself or remote therefrom, the drawer is snapped shut and the circuit controlling the opening mechanism is broken and cannot be re-set except by authorized entrance to the adjacent compartment containing the operating mechanism.

Support 1, such as a counter, may have bolts 2 upwardly therethrough to be engaged by nuts 3 in chamber 4 of a cabinet formed by bottom plate 5, side walls 6, 7, rear wall 8, and top deck 9. The nuts 3 effectively engage the bottom 5 to assemble the cabinet upon the support 1. In some instances it may be desirable to have the cabinet suspended from the counter 1, and to this end angle brackets 10 may be assembled with the top 9 and fastened by screws or other suitable fastening means to the under side of the counter or support 1.

The side walls 6, 7, provide front portions 11 between which there is opening 12 to the cabinet interior. Cross member 13 extending from the front portions 11 divides the opening 12 into upper portion 14 and lower portion 15. The upper portion 14 is closed by drawer front 16, while the lower portion 15 may be closed by plate 17. This plate 17, when removed, gives access to the compartment 4 below drawer 18, in which compartment may be disposed the drawer operating mechanism disclosed herein. It being desirable to prevent unauthorized tampering with the mechanism or operation of the drawer effected through the compartment, such is prevented by locks 19, 20, each operable by a different key so that such may be separately held by a proprietor or auditor and by an attendant or clerk as the case may be. It is therefore necessary that two keys be used to retract bolt 21 from cabinet reinforcement member 22 to remove the plate. The plate is provided with lugs 23 engaging cabinet reinforcement 24 on the opposite side from the bolt.

Means are provided to prevent forcing the locks 19, 20. To this end, on each side of the lock housing 25 there extends brackets 26 for mounting bolts 27, each normally urged upward by compression helical springs 28 but held against such upward thrust by lug 29 engaging bar 30, which is attached to the lower ends of the bolts 27. In the ordinary attempt to force a lock of the type shown, the locks are driven inward to drive the bolt 21 away from the reinforcement 22 or to entirely knock the lock housing 25 free from the plate 17. When this is done, the lug 29 is forced clear of the bar 30, allowing the springs 28 to throw the bolts 27 upward into re-locking position with the reinforcement 22.

Authorized opening of this compartment gives access to the devices therein controlling drawer operation. On the inner upper portion of each side of the cabinet is mounted a bracket 31, each bracket carrying a pair of rollers 32, and spaced therebelow a second pair of rollers 33. The drawer 18 is provided with sides 34, which have welded thereto slide members 35, extending on each side between the roller pairs 32, 33, as a mounting for the drawer. The drawer is freely movable into open or closed position as supported by the rollers when free of predetermined control. The drawer 18 is provided with back 36 to which spring 37 may be mounted by bracket 38. The spring 37, in drawer closed position, nests in cup 39, carried by bracket 40 from the cabinet rear 8. From closed position, release of the drawer permits the spring member 37 to throw the drawer into open position, and as manually closed again, the rear travel extent of the drawer is limited by stops 41, against which the back of the drawer front may abut. The drawer may be divided into such compartments as desired, herein being shown as change compartments 42 and bill compartments 43; the bill compartments 43 being supplied with weights 44.

The drawer 18 is provided with bottom 45 having brackets 46 welded thereto, carrying roller 47. The roller 47, in drawer closed position, engages latch 48, mounted by bracket 49, as carried by plate 50 from the cabinet bottom 5. The latch 48 is normally urged upward by spring 51, cooperating between the bracket 49 and washer 52 about the latch 48. Pin 53 through the latch determines the upward extent thereof by abutting upper reach of the bracket 49.

The upper end of this latch 48 is tapered so that as the drawer is normally manually pushed to closed position, the roller 47, contacting the tapered face, will force the latch downward against the resistance of the spring 51, which spring will again force the latch upward immediately the roller has passed therebeyond. The stops 41 and the latch 48 are so positioned that there is just clearance to close the drawer and yet hold such against any looseness. Attached to the lower end of the latch 48 are links 54 extending to armature 55 of solenoid 56. Completing an electric circuit to the solenoid 56 causes the armature 55 to pull the latch 48 downwardly so that the spring 38 can then throw the drawer into open position. The drawer in this open position may be manually closed, or in the case of an emergency, may be snapped closed by other mechanism within the cabinet, either controlled at the cabinet or remotely therefrom.

To this end there is provided a pair of rods 57 extending across the cabinet in the direction of drawer operation, said rods being mounted by bracket 58, welded to the inside of cabinet back 8; the remote ends therefrom being mounted in brackets 59, welded to the reinforcement 22 and having pins 60 extending through the rods to prevent removal from the rod mountings. Mounted on each of the rods 57 is a sleeve 61 slidably shiftable along the rods. The sleeves 61 extend through plate 62 to have collars 63 of said sleeves welded to the plate, so that the sleeves and plate form a shiftable member horizontally slidable along the rods 57 as guides therefor. About each rod is helical compression spring 64 normally urging the shiftable member 62 toward the rear of the cabinet.

Welded to the shiftable member 62 is bar 65, carrying on each end thereof bumper 66 to engage downwardly extending member 67, as carried by the rear termini of the slide members 35 of the drawer. The shiftable or closing member is normally held toward the front of the interior of the cabinet. To this end, block 68 is welded to the member or plate 62 and carries member 69 hinged thereto mounting roller 70, remote from the hinge connection to the block. The roller 70 normally engages catch 71, controlled by mechanism similar to the control mechanism for the latch 48; the control therefor being through operation of solenoid 72.

Upon energizing of the solenoid 72, the catch 71 is withdrawn from its contact with the roller 70 and the springs 64 throw or snap the shiftable member 62 backwardly across the cabinet along the guides 57; the bumper members 66 having contacted the brackets 67, thereby pushing the drawer inwardly until the latch 48 has locked such closed. The springs 64 are of sufficient force to overcome the resistance of the spring 37. Normally opening of the drawer again re-sets the closing mechanism by the bracket 67 pulling the member 62 toward the front of the cabinet until the roller 70 has passed the catch 71 and is then held against rear shifting until re-operation of the solenoid 72. In order to insure the hinge member 69 dropping so that it does not contact the cabinet back by force of the quick throw rearwardly, spring 73 extends between the bracket 49 and the member 69. The spring 73 acts to pull the member 69 downwardly immediately the catch 71 has released the member for its movement rearwardly.

By the insertion of the member 69 between the catch and the block 68, the springs 64 are more greatly compressed for a quicker closing throw without unnecessary length of the cabinet, thus permitting compactness of the device. However, in some instances wherein the cabinet length is immaterial, the roller 70 may be directly carried by the block 68 (Fig. 9). In such instances, the spring 64 may be lengthened and the cabinet extent between the rear of the drawer and the cabinet rear increased to give the desired stroke or length of throw to insure complete closing of the drawer.

In the compartment 4 adjacent the solenoids 56, 72, is a third solenoid 74, which is energized simultaneously with the energizing of the solenoid 72. The solenoid 74 is mounted on plate or bracket 75, carried by bracket 76 welded to the bottom 5 of the cabinet. Carried above the solenoid 74 are switches 77, 78, operated by armature 79. When the solenoid 74 is energized, the armature 79 moves upward, opening the switch 77 and closing the switch 78. The armature 79 carries pin 80, and as this pin 80 is lifted upon the solenoid being energized, notch 81 of trigger 82 engages the pin 80 and holds the armature 79 upward until manually released. The trigger 82 has arm 83 extending therefrom through the bracket 75 to terminate in button or head 84. Between this button or head 84 and the bracket 75 is compression helical spring 85 normally urging the trigger forward so that as the pin is lifted upward, the notch 81 is brought underneath the pin and held. In order to re-set the device it is necessary for authorized entrance into the cabinet through the opening 15 and by pushing the button 84 against the resistance of the spring 85, the trigger releases the armature 79 which drops by gravity to then close the switch 77 and open the switch 78.

In the control of the device herein, power lines 86, 87, extend to plug 88 which may be inserted in socket 89 as mounted on the side 6 of the cabinet. To establish a circuit it is simply necessary to plug in a convenient commercial electric system, such as 110 A. C. From the socket 89 the line 86 extends to the solenoid 72; the circuit to said solenoid being completed by line 90 past switch 91, thence by line 92 to the line 87. Connected in parallel with the switch 91, which may be a foot switch placed at a point convenient to the cashier, may be a series of remote switches 93 placed at various convenient places in a building, and also switch 94, which may be carried on the side 7 of the cabinet at a point convenient for an operator. The closing of any of the switches 91, 93, or 94 thereby completes the circuit to the solenoid 72, releasing the closing device which snaps the drawer shut. The solenoid 74 also has line 86 extend thereto and by line 95 extending to line 90 is placed in parallel with the solenoid 72, so that upon energizing of the solenoid 72 the switch 78 is closed, completing a circuit through lines 96, 97, to an alarm either in the place of business or at some remote plate, as a commercial alarm company or otherwise.

In some instances, the alarm circuit as A. D. T. normally requires a closed circuit, and to this end the switch 78 is normally closed and simultaneously opened with the control switch 77 so that the alarm is thus operated.

For normal operation of the drawer, that is, the authorized opening and closing for re-opening, the line 86 has branch 98 extend through the switch 77, thence by line 99, through operating switch 100, thence by line 101 to solenoid 56, the circuit of which is completed through line 102 to the line 87.

Upon closing of the switch 100, which is adjacent the switch 94 and located for manual operation by the attendant, the solenoid 56 is energized, such energizing withdrawing the latch from contact with the roller 47 thereby allowing the spring 37 to throw the drawer outwardly from the cabinet. The switch 77 is operated by the armature 79. The closing of the alarm circuit also opens this circuit and hence renders the switch 100 ineffective for operation once any one of the emergency switches has been closed. The re-set mechanism holds this circuit open until re-set by entrance into the cabinet.

In normal operation of the cash drawer herein, the closing mechanism is in a position entirely out of the way of offering any interference to free and easy movement of the drawer to opened and closed positions.

The deck 9 may be used as a support for cash register or tabulating machine 103. Either the switch 100 or the switch 94 can be carried by such a machine for remote control of the drawer; the operating buttons therefor being among the keys thereon.

What is claimed and it is desired to secure by Letters Patent is:

1. A protective receptacle including a cash drawer, a housing therefor, spring means for the release of the drawer, a latch in the housing for maintaining the drawer in the housing against the action of the spring means, a solenoid for retracting the latch to release the drawer for opening movement, a circuit for said solenoid, drawer closing means embodying mechanism for closing the drawer, a catch normally holding the mechanism against operation, a solenoid for operating said catch, a circuit therefor, means for closing said circuit to said catch operating solenoid to allow the mechanism to close said drawer, and means in said circuit simultaneously opening the circuit to said latch operating solenoid.

2. A drawer, a cabinet mounting for the drawer, a latch for holding the drawer normally in closed position, a solenoid for releasing the latch, a spring normally thrusting the closed drawer to opened position and holding the drawer against said latch, a compression spring device, a catch normally holding the device against drawer closing movement, a remote control for the catch effective to release the spring device to close the drawer, and drawer control means cooperating with said remote control to render the latch effective to hold the drawer closed.

3. A drawer, a cabinet mounting therefor in which said drawer is shiftable to opened and closed positions, drawer opening mechanism, drawer closing mechanism, each mechanism including a catch, a control for each catch, and selectable means for said controls effective to render the drawer opening mechanism inoperable upon operation of the drawer closing mechanism.

4. A drawer, a cabinet mounting therefor in which said drawer is shiftable to opened and closed positions, drawer opening mechanism embodying a spring, a latch holding said drawer closed against movement by the spring, a shiftable member adjacent the drawer, a catch normally holding the shiftable member clear of normal drawer operation, a solenoid for operating said catch, means moving said shiftable member into drawer contacting position to close said drawer, and means rendering the drawer opening mechanism inoperable upon release of the shiftable member.

5. A drawer, a cabinet mounting therefor in which said drawer is shiftable to opened and closed positions, drawer opening mechanism including a solenoid-controlled latch, drawer closing mechanism including a solenoid operated catch, and a third solenoid in parallel with the catch operating solenoid, switch means operable by said third solenoid, said switch means forming a part of the circuit to said latch operating solenoid.

6. A drawer, a cabinet providing a drawer guide mounting in which said drawer is shiftable to opened and closed positions, drawer propelling opening mechanism, drawer retracting closing mechanism, each mechanism including a catch, a control for each catch, selectable means for said controls effective to render the drawer opening mechanism inoperable upon operation of the drawer closing mechanism, and re-set means for rendering said drawer opening mechanism operative for effecting re-opening of the drawer.

7. A drawer, a cabinet mounting therefor in which said drawer is shiftable to opened and closed positions, drawer opening mechanism embodying a solenoid having an operating switch exterior of the cabinet, drawer closing mechanism embodying a solenoid having an operating switch exterior of the cabinet, means operable simultaneously with the drawer closing mechanism to open the circuit of the drawer opening mechanism apart from the said exterior switch, and re-set means within the cabinet for again closing said opening circuit.

8. A drawer, a cabinet mounting therefor in which said drawer is shiftable to opened and closed positions, a latch normally holding said drawer in closed position, a solenoid operable to release said latch, a circuit for said solenoid, mechanism operable to close said drawer, and a control actuated by said mechanism for rendering the latch effective to hold the drawer closed.

9. A drawer, a cabinet mounting therefor in which said drawer is shiftable to opened and closed positions, a latch normally holding said drawer in closed position, a solenoid operable to release said latch, a circuit for said solenoid, a shiftable member adjacent said drawer, a catch for holding said member against interference with drawer shifting, a second solenoid for releasing said catch, and means for releasing and thereby freeing the member to close the drawer, said means precluding operation of said circuit to release the latch.

10. A drawer, a cabinet mounting therefor in which said drawer is shiftable to opened and closed positions, a latch normally holding said drawer in closed position, a solenoid operable to release said latch, a circuit for said solenoid, a shiftable member adjacent said drawer, a catch for holding said member against interference with drawer shifting, a solenoid for releasing said catch, means for causing said member to close the drawer, a circuit to said catch operating solenoid, and control means effective as the drawer is closed for opening the latch solenoid circuit when operable to release said catch.

11. A drawer, a cabinet mounting therefor in which said drawer is shiftable to opened and closed positions, a shiftable member movable in the direction of drawer operation, said member normally held in a position away from interference with drawer operation, a catch holding said member in such position, a solenoid for releasing said catch, a spring for shifting said member into drawer engaging and closing position, a circuit operating said catch, a lock to hold the drawer closed and intercontrol mechanism operated by said circuit simultaneously to operate the solenoid to release the catch to close the drawer and preclude release of the drawer by the lock.

12. A drawer, a cabinet mounting therefor in which said drawer is shiftable to opened and closed positions, a slide adjacent said drawer, a member shiftable along said slide, a spring for engaging said member to shift such along the slide, a catch for holding said member out of drawer operating position against the resistance of said spring, said member having a bar hinged thereto, a catch engaging the opposite end of said bar, and a solenoid for operating said catch to free the member to act on the drawer in shifting the drawer relatively to the cabinet.

13. A drawer, a cabinet mounting therefor in which said drawer is shiftable to opened and closed positions, spring means for moving the drawer into open position, a latch normally holding the drawer against movement by said spring, a solenoid for releasing said latch, a circuit for controlling the solenoid, a switch in said circuit operable from exterior of the housing to close said circuit, an additional normally closed switch in said circuit, a movable member in said cabinet, a catch normally holding said movable member against shifting, a solenoid for said catch, a circuit for controlling the catch solenoid, a switch exterior of the cabinet in said circuit, said switch when closed releasing the catch, means operable upon releasing said catch to shift said movable member to close the drawer, and means to simultaneously open said normally closed switch in the latch operating circuit.

14. A drawer, a cabinet mounting therefor in which said drawer is shiftable to opened and closed positions, spring means for moving the drawer into open position, a latch normally holding the drawer against movement by said spring, spring means for shifting the drawer into closed position against the resistance of the opening spring means, a catch normally holding its closing spring means inoperative, means for releasing said latch, and means for releasing said catch, said releasing means being inter-connected to effect holding of the drawer as to the cabinet as a result of drawer shifting from said release.

CHARLES F. MEILINK.